(12) United States Patent
Schweizer et al.

(10) Patent No.: US 12,031,573 B2
(45) Date of Patent: Jul. 9, 2024

(54) GAS BEARING AND METHOD FOR PRODUCING SAME

(71) Applicant: Technische Universität Darmstadt, Darmstadt (DE)

(72) Inventors: Bernhard Schweizer, Darmstadt (DE); Marcel Bauer, Darmstadt (DE); Marcel Mahner, Bad Nauheim (DE); Markus Rieken, Darmstadt (DE); Pascal Zeise, Darmstadt (DE)

(73) Assignee: Technische Universität Darmstadt, Darmstadt (DE)

( * ) Notice: Subject to any disclaimer, the term of this patent is extended or adjusted under 35 U.S.C. 154(b) by 76 days.

(21) Appl. No.: 17/414,303

(22) PCT Filed: Dec. 17, 2019

(86) PCT No.: PCT/EP2019/085685
§ 371 (c)(1),
(2) Date: Jun. 15, 2021

(87) PCT Pub. No.: WO2020/127290
PCT Pub. Date: Jun. 25, 2020

(65) Prior Publication Data
US 2022/0065288 A1 Mar. 3, 2022

(30) Foreign Application Priority Data
Dec. 18, 2018 (DE) .......................... 102018132678.5

(51) Int. Cl.
*F16C 17/02* (2006.01)
(52) U.S. Cl.
CPC ........ *F16C 17/024* (2013.01); *F16C 2240/54* (2013.01); *F16C 2240/60* (2013.01)

(58) Field of Classification Search
CPC ........ F16C 17/024; F16C 23/02; F16C 23/04; F16C 25/02; F16C 25/04; F16C 27/02
See application file for complete search history.

(56) References Cited

U.S. PATENT DOCUMENTS 3,893,733 A * 7/1975 Silver .................. F16C 17/042
384/106
4,099,799 A 7/1978 Etsion
(Continued)

FOREIGN PATENT DOCUMENTS

DE 2027607 A 2/1971
DE 102016211298 A1 12/2016
(Continued)

OTHER PUBLICATIONS

German Patent and Trademark Office, Search Report, Application No. 102018132678.5, mailed Oct. 21, 2019, 9 pages.
(Continued)

*Primary Examiner* — Alan B Waits
(74) *Attorney, Agent, or Firm* — Mahamedi IP Law LLP (57) ABSTRACT

The invention relates to a gas bearing for contactlessly bearing a rotatable element (50). The gas bearing comprises: a housing (100) having an opening for receiving the rotatable element; and at least two sliding films (200), which are arranged on an interior (110) of the opening without overlap and which each have a first end portion (210) and a second end portion (220) for support on the housing (100). The sliding films (200) are designed to radially support the rotatable element relative to the housing (100) only by means of the first and second end portions (210, 220), the second end portion (220) providing frictional contact with the interior (110) and the first end portion (210) being fastened to the housing.

15 Claims, 5 Drawing Sheets

(56) References Cited

U.S. PATENT DOCUMENTS

| | | | | |
|---|---|---|---|---|
| 4,153,315 A | * | 5/1979 | Silver | F16C 17/024 |
| | | | | 384/106 |
| 4,195,395 A | * | 4/1980 | Silver | F16C 33/26 |
| | | | | 384/106 |
| 4,262,975 A | * | 4/1981 | Heshmat | F16C 17/024 |
| | | | | 384/119 |
| 4,526,483 A | * | 7/1985 | Hishikawa | F16C 17/024 |
| | | | | 384/106 |
| 4,616,388 A | * | 10/1986 | Soum | F16C 17/024 |
| | | | | 384/103 |
| 5,634,723 A | * | 6/1997 | Agrawal | F16C 17/024 |
| | | | | 384/106 |
| 2005/0201646 A1 | | 9/2005 | Nagata et al. | |
| 2014/0140645 A1 | * | 5/2014 | Meacham | F16C 27/02 |
| | | | | 384/129 |

FOREIGN PATENT DOCUMENTS

| | | |
|---|---|---|
| EP | 0068387 A1 | 1/1983 |
| EP | 2706245 A1 | 3/2014 |
| EP | 2759724 A1 | 7/2014 |
| JP | S6037623 U | 3/1985 |
| SU | 709857 A1 | 1/1980 |
| WO | 2006029827 A1 | 3/2006 |

OTHER PUBLICATIONS

European Patent Office, PCT International Search Report and Written Opinion, Application No. PCT/EP2019/085685, dated Apr. 20, 2020, 25 pages.

* cited by examiner

GAS BEARING AND METHOD FOR PRODUCING SAME

The present invention relates to a gas bearing (in particular an air bearing) and a method for manufacturing the gas bearing and, in particular, to an aerodynamic rotor bearing arrangement by means of (prestressed) sliding foils.

BACKGROUND

Air bearings, or gas bearings in general, are used for high-speed rotors (up to 180,000 revolutions per minute) to minimize friction. A bearing arrangement for such high speeds is only possible via air bearings, wherein the co-turning air forms a cushion on which the rotors are held.

Figure 5A:
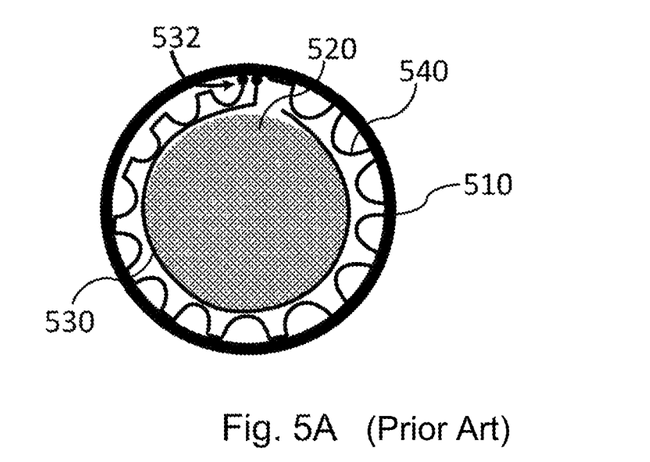
FIGS. 5A and 5B show conventional air bearings.
Figure 5B:
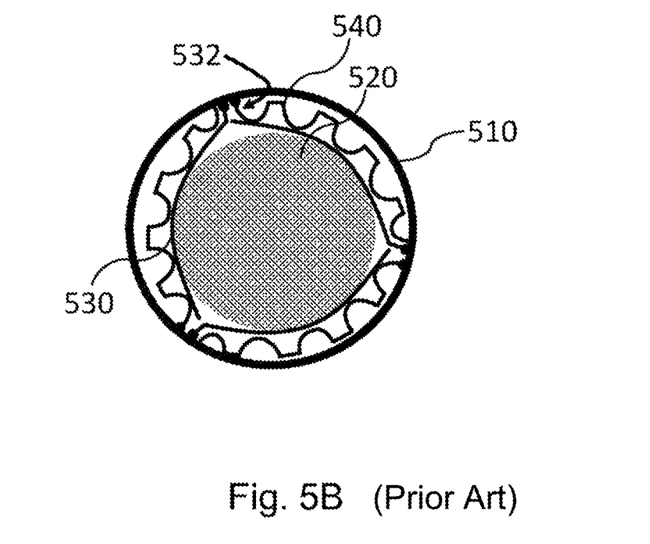

FIGS. 5A and 5B show conventional air bearings comprising a housing 510, a rotor 520, at least one so-called top foil 530 and at least one bump foil 540. For example, the top foil 530 may be formed as a single element as shown in FIG. 5A. It is also possible for the top foil 530 to comprise multiple top foils, such as those shown in FIG. 5B, which are then arranged adjacent to each other (along the angular movement of the rotor 520). For example, the top foil(s) 530 may be attached to the housing 510 via fastening elements 532, and the opposite section is free-floating between the rotor 510 and the bump foil 540. The bump foils 540 serve to cushion the rotor 520 for radial impacts. Thus, they are used as shock absorbers or bumpers to keep the rotor 520 as centered as possible in the opening of the housing 510.

When the rotor 520 rotates at very high speeds (several 10,000 rpm), the entrained air causes an air gap or air cushion to form between the rotor 520 and the top foil 530, so that the rotor 520 is held floating in a centered position. Rotation of the rotor 520 thus causes the rotor 520 to lift off the top foil 530, thereby significantly reducing frictional resistance, after which only air friction is present. The top foil(s) 520 and the bump foil(s) 540 serve as a support for a non-rotating rotor 520 or, as mentioned, as a damper when unexpected radial impacts occur.

A disadvantage of these conventional air bearing arrangements is that they are complex to manufacture and assemble and therefore require additional costs. In addition, these air bearing arrangements exhibit poor predictability due to the presence of many contact pairs for the components that are not precisely defined or are difficult to define.

Thus, there is a need for other solutions that are simpler and less expensive to manufacture, but still provide support comparable to that provided by conventional air bearings.

SUMMARY OF THE INVENTION

At least a part of these problems is solved by an air bearing according to claim 1 and a method of manufacture according to claim 10. The dependent claims relate to advantageous further embodiments of the objects of the independent claims.

Embodiments relate to a gas bearing for supporting a rotatable element in a contact-free manner. The gas bearing comprises a housing with an opening for receiving the rotatable element and at least two sliding foils. The sliding foils are arranged without overlap on an inner side of the opening and each have a first end portion and a second end portion for support on the housing. The sliding foils are configured to radially support the rotatable element relative to the housing only through the first and second end portions, wherein the second end portion provides frictional contact with the inner side and the first end portion is secured to the housing.

In the context of the present invention, the term "rotatable element" is intended to be broadly construed to comprise, in particular, a rotor, a shaft, a journal, or any other rotating element. Radial impacts of the rotatable element are defined in such a way that an externally acting force or vibrations cause a force to act perpendicular to the axis of rotation the rotatable element (i.e. perpendicular to the axial axis of the rotatable element). The rotatable element can be at least partially supported against such radial impacts by each sliding foil. A gas bearing is in particular intended to mean an air bearing, even though the invention is not intended to be limited to air and may include other gaseous media.

The directions are defined as follows: The axial direction is parallel to the axis of rotation of the rotatable element, and the radial direction points radially away from the axis of rotation in the cross-sectional view perpendicular to the axis of rotation. The tangential direction is perpendicular to the axial direction and the radial direction.

The sliding foils are arranged one after another along the tangential direction between the rotatable element and the housing, wherein they can abut against each other. The end portions thus represent the regions at the two edges in the tangential direction, the second end portion being movable relative to the housing when the frictional force is overcome.

Although the operating principle of the air bearing is already possible with two sliding foils, it is particularly advantageous to have more than two sliding foils. For example, centering of the rotatable element is achieved by three or four sliding foils. However, the number of sliding foils should not be limited. For example, the rotatable element may be held by the sliding foils in an area between the end portions.

Optionally, at least one of the sliding foils is formed multilayered, wherein the individual layers are attached to the housing on the same side or on opposite sides. The individual layers can thus bend together or hold each other during radial impacts of the rotatable element.

Embodiments also relate to an air bearing for supporting a rotatable element in a contact-free manner, having a housing with an opening for receiving the rotatable element and a plurality of multilayered sliding foils. In this embodiment, each multilayered sliding foil is arranged without overlap with an adjacent multilayered sliding foil on an inner side of the opening, wherein the individual layers of the multilayered sliding foils are all attached to the housing by a first end portion and the opposite second end portion makes frictional contact with another layer of the multilayered sliding foil or with the housing. In addition, along a surface facing the rotatable element, each layer of the multilayered sliding foils forms a segment of a circle or a circular segment or an arc in a radial section.

In particular, the plurality of multilayered sliding foils can be arranged one on top of the other, wherein a maximum support force relative to the housing is to be applied by the first and second end portions (since no further supports are provided centrally).

To achieve the most effective support, a friction coefficient (coefficient of friction) of the frictional contact can be increased by at least one of the following features:
  Coating the second end portion and/or the inner side of the opening with a material that increases the coefficient of friction;
  the second end portion and/or the inner side of the opening has an increased roughness;

the second end portion has a contour to increase friction to the inner side of the opening;

the second end portion is angled in a radial cross-sectional view (along the tangential direction) to form an increased contact angle for frictional contact relative to the inner side of the opening.

The specific contours at the end of the sliding foils may comprise, for example, curves, slits, corners, teeth, tips, etc.

It is also possible that the opening in the housing deviates from a circular shape in order to increase the contact angle to the inner side compared to the circular shape.

An increased contact angle has the effect that the vertical component of the force (acting perpendicularly on the housing or the inner side) also increases, which in turn leads to a higher frictional force and friction work.

Optionally, to increase the stiffness of at least one sliding foil, a thickness of the at least one sliding foil (or layer) may vary between the first end portion and the second end portion. This increases the supporting effect for radially acting forces.

Optionally, the attachment of the first end portion to the housing comprises at least one of the following connections: a soldered connection, a welded connection, an adhesive connection, an at least partial insertion of the first end portion into a recess of the housing.

Embodiments also relate to a rotor suspension having an air bearing as previously described and a rotatable element insertable into the opening of the housing, such that the sliding foils are disposed between the rotatable element and the housing to support forces acting radially on the rotatable element relative to the housing and to form an air cushion with increasing rotational speeds.

Optionally, the at least two sliding foils are exchangeable to select the at least two sliding foils with respect to their stiffness and depending on the rotatable element and the expected radial impacts. This selection is intended to ensure that the rotatable element is reliably held centrally in the opening of the housing and, at the same time, that an air gap is created between the at least two sliding foils and the rotatable element during the rotational movement (at a desired speed). The exchangeable sliding foils can be inserted in grooves or recesses in the housing, for example.

Embodiments also relate to a method of manufacturing an air bearing for supporting a rotatable element in a contact-free manner. The method comprises:
  providing a housing having an opening for receiving a rotatable element;
  arranging at least two sliding foils extending in an arc-shaped manner single- or multilayered between a first end portion and a second end portion on an inner side of the opening without overlapping adjacent sliding foils, wherein relative to the housing the first end portion is tangentially immovable and the second end portion provides a frictional contact with the housing or other layer of a multi-layered sliding foil; and
  inserting the rotatable element into the opening so that the at least two sliding foils are disposed between the rotatable element and the housing.

In turn, the rotatable element only needs to be radially supported relative to the housing via the first end portion and the second end portion.

The bending of the sliding foils and the optimized geometry of the housing mean that the angle of impact of the sliding foils on the inner side is increased and thus the force acting perpendicularly on the inner side is intensified. This can increase the frictional force and thus the supporting force. It can also be used to adjust the friction path.

Optionally, arranging the sliding foils includes fixedly attaching the sliding foils to the housing or forming a releasable connection to the housing.

According to further embodiments, the sliding foils are arranged under a prestress between the rotatable element and the housing. It is also possible to adjust the support force of the air bearing via the selected prestress.

It is also possible that the stiffness or prestress of the individual sliding foils is not selected homogeneously to be the same for all sliding foils, but that, for example, a higher stiffness is provided in a foil (or certain layers of multilayered sliding foils) located vertically at the bottom. This can be useful, for example, if certain radial impacts or radial forces are to be expected in a particular direction, so that the sliding foils have a particularly high stiffness in this direction. Optionally, however, it is also possible for all the sliding foils to be of identical design and only to be arranged at different angular regions within the opening.

BRIEF DESCRIPTION OF THE FIGURES

The exemplary embodiments of the present invention will be better understood on the basis of the following detailed description and the accompanying drawings of the different exemplary embodiments, which should, however, not be understood such that they limit the disclosure to the specific embodiments, but rather they merely serve for explaining and understanding.

DETAILED DESCRIPTION

Figure 1:
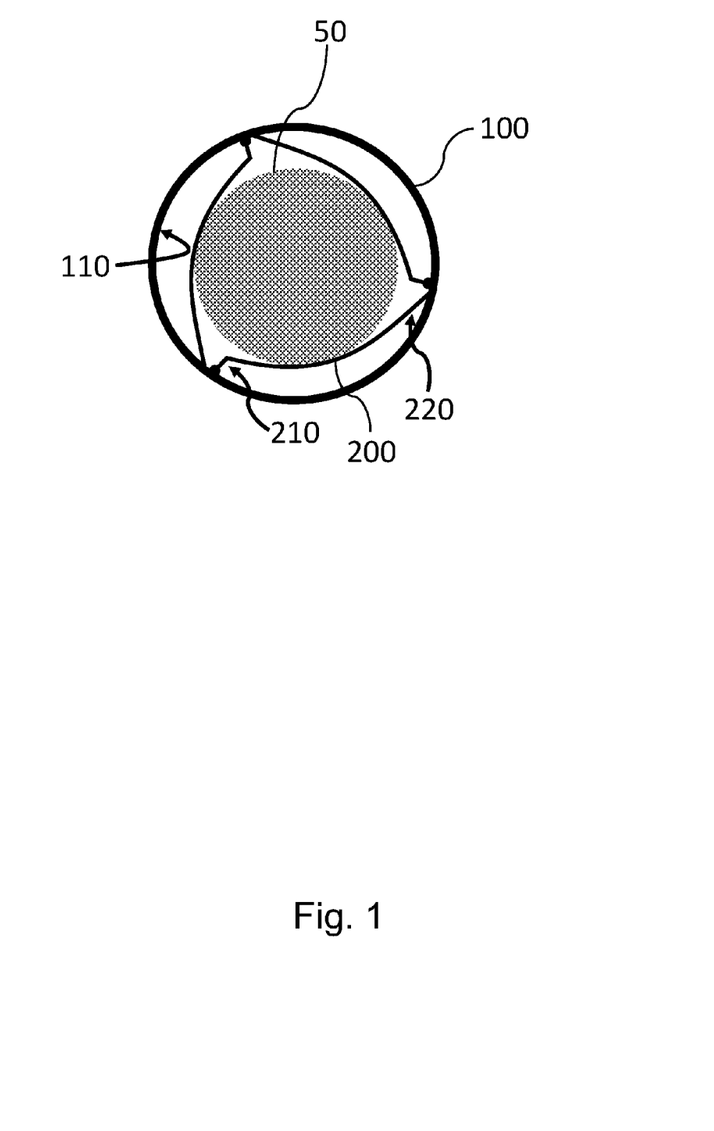
FIG. 1 shows an air bearing according to an embodiment of the present invention.

FIG. 1 shows an air bearing for supporting a rotatable element (in particular a high-speed rotor) in a contact-free manner according to an embodiment of the present invention. The air bearing comprises a housing 100 having an opening for receiving the rotatable element 50 and at least two sliding foils 200 (preferably three or four) arranged without overlap in a tangential direction on an inner side 110 of the opening. The sliding foils 200 are arc-shaped (not wave-shaped) and each comprise a first end portion 210 and a second end portion 220 for support on the housing 100. The sliding foils 200 are configured to radially support the rotatable element 50 relative to the housing 100 only through the first end portion 210 and the second end portion 220, wherein the rotatable element 50 contacts the sliding foil 200, for example, between the first end portion 210 and the second end portion 220.

The second end portion 220 provides frictional contact with the inner surface 110 of the opening and is thus movable relative to the housing. The first end portion 210 may be fixedly attached to the housing 100, or in positive contact with the housing 100 (e.g., engaging a groove or recess in the housing, see FIGS. 4A and 4B below; more complex attachments, e.g., L-shaped or T-shaped, are also conceivable, see FIGS. 4C and 4D below), such that relative movement along the inner surface 110 is not possible.

It will be appreciated that as long as the rotatable element 50 is not yet rotating relative to the housing 100, the rotatable element 50 is in contact with at least one (or all) of the sliding foils 200. However, as the rotational speed 50 increases, air is entrained between the sliding foils 200 and the rotatable element 50, forcing the sliding foils 200 away from the rotatable element 50 and creating an air cushion between the sliding foils 200 and the rotatable element 50. The adhesion of the air to the rotatable element 50 thus creates an air film or air cushion at very high speeds so that the rotatable element 50 lifts off the sliding foils 200. Typically, this effect only occurs at several 10,000 rpm or more than 100,000 rpm. These air bearings can be used, for example, for rotations of up to 200,000 rpm.

In order to provide reliable damping protection for impacts or radial movements of the rotatable element, the properties of the sliding foils 200, such as a prestress or geometries or the coupling to the housing 100, are important and must be set according to the application.

In the following, various measures are described that can be implemented in embodiments to achieve the desired damping protection.

FIGS. 2A to 2D show embodiments of the present invention that achieve a desired stability against radial impacts of the rotatable element 50 relative to the housing 100 by adjusting the frictional contact. For example, a high coefficient of friction between the sliding foil 200 and the housing 100 means that the sliding foils 200 are better able to dampen radial impacts, as higher friction makes it difficult for the sliding foils 200 to move relative to the housing 100.

Figure 2A:
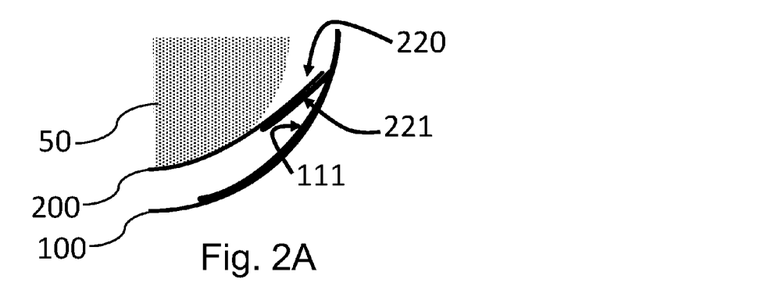
FIGS. 2A-2D illustrate embodiments of the present invention that achieve a desired stability against radial impacts of the rotatable element relative to the housing by adjusting the frictional contact.

In FIG. 2A, an embodiment is shown in which the second end portion 220 has, for example, a coating 221 that has the effect of increasing the coefficient of friction with respect to the housing 100. Similarly, it is possible for the inner side 110 of the housing to have a coating 111 that increases the coefficient of friction between the sliding foil 200 and the housing 100. The two coatings 221, 111 may also be matched to each other so as to achieve the highest possible friction or matched. The same effect can be achieved if an increased roughness of the surface is formed in the area of the coatings 111, 221.

Figure 2B:
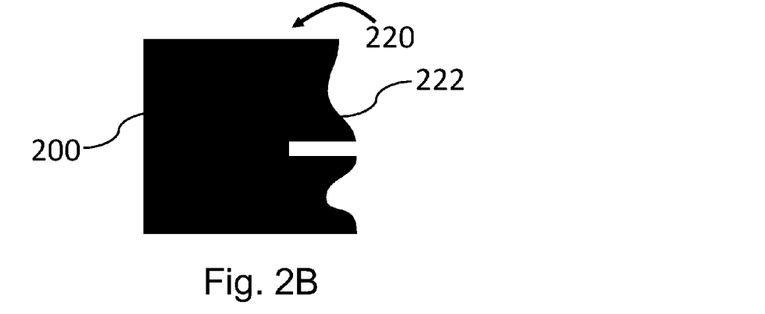

FIG. 2B shows an embodiment of the sliding foils 200 in which the second end portions 220 have a surface structure/contour 222 adapted to increase friction between the sliding foil 200 and the inner side 110. For example, the surface structure 222 may include wave-shaped sections, indentations, tooth-like protrusions, or other structures that result in an increase in friction. It is also possible for the sliding foil 200 to be suitably thin, so that a sharp edge is formed at the end, resulting in high contact pressure and thus high friction.

Figure 2C:
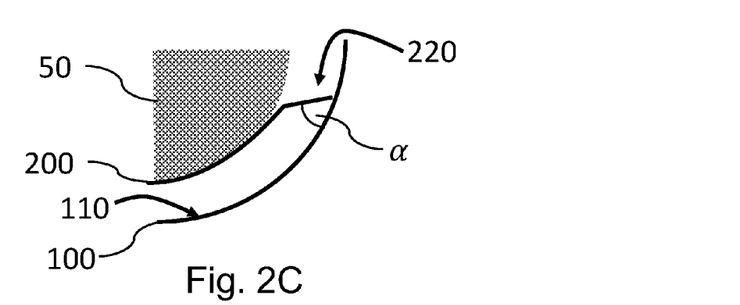

FIG. 2C shows an embodiment of the present invention in which the second end portion 220 is angled relative to the remaining portion of the sliding foil 200. This results in the end of the sliding foil 200 forming a larger contact angle α with the inner side 110. The greater the contact angle α, the greater the force component acting perpendicularly on the inner side 110 during a radial impact. The contact angle can also be used to set the friction path. The vertical force component is relevant for the frictional force, so that the frictional force can be adjusted via an adapted chamfer of the second end portion 220.

Figure 2D:
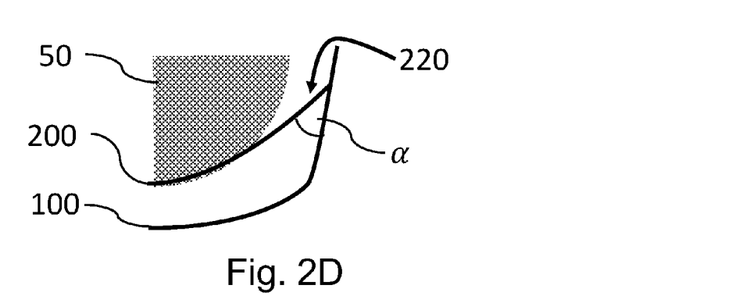

FIG. 2D shows another embodiment of the air bearing in which the opening in the housing 100 is not circular—even though the rotatable element 50 still has a circular cross-section. According to this embodiment, the opening in the housing 100 is changed such that the intersection angle α between the second end portion 220 and the inner side 110 becomes larger or is adjusted to a desired value in order to change, in particular increase, the frictional force (or the force component essential thereto) or the frictional path compared to a circular opening.

Thus, the embodiments of FIGS. 2A to 2D can be used to adjust (especially increase) the coefficient of friction.

Figure 3A:
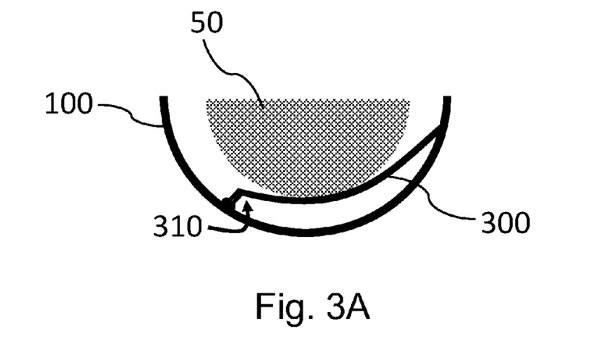
FIGS. 3A-3C show further embodiments of the sliding foils used.
Figure 3B:
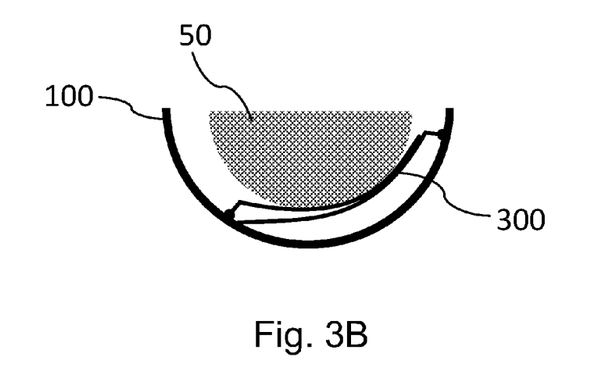
Figure 3C:
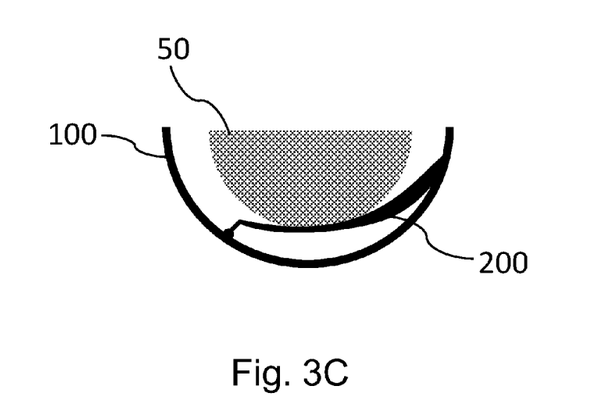

FIGS. 3A to 3C show further exemplary embodiments of the sliding foils 200, 300 used, which can also be used to better cushion radial impacts.

For this purpose, the exemplary embodiment of FIG. 3A uses sliding foils 300 having a plurality of layers, wherein all layers of the sliding foil 300 are arranged on top of each other and are fixed to the housing 100 on the same side, as an example, i.e., the first end portions 310 of the layers are all located on the same side along the tangential direction.

In FIG. 3B, an exemplary embodiment is shown in which at least one of the sliding foils 300 has multiple layers, wherein the individual layers are fixedly connected here to the housing 100 on opposite sides. Two layers are shown as an example. However, there can also be more than two layers, which are attached to the housing arbitrarily (e.g. alternately) on one side or the other (with respect to the tangential direction). The friction between the layers can in turn be adjusted via coating and/or a surface roughness.

FIG. 3C shows an exemplary embodiment of the present invention in which at least one sliding foil 200, 300 (single-layered or multilayered) has a variable thickness so as to better cushion the radial impacts of the rotatable element 50 without the sliding foil 200, 300 coming into contact with the inner side 110 in a region between the end portions.

Only one sliding foil 200, 300 was shown here at a time. The other sliding foils were omitted for simplicity. They can be formed in a similar way. Combinations of the different sliding foils 200, 300 are also possible.

Furthermore, in these exemplary embodiments, the first end portions 210, 310 may be connected to the housing 100 by, for example, a welded contact, an adhesive contact, a soldered contact. It is also possible to slide the first end portions 210, 310 into corresponding grooves in the housing or to use rivet or screw connections as fasteners.

FIGS. 4A to 4D show embodiments for attaching the first end portion 210, 310 of the single- or multilayered sliding foils 200, 300 to the housing 100. In the exemplary embodiments shown, the first end portions 210, 310 of the sliding foils 200, 300 engage corresponding recesses, grooves, or indentations of the housing 100 to provide a firm hold of the sliding foils 200, 300 (or layers thereof) to the housing.

Figure 4A:
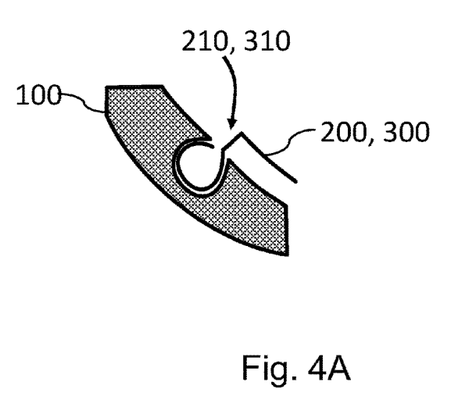
FIGS. 4A-4D show embodiments for attaching the first end portion of the single- or multilayered sliding foils to the housing.
Figure 4B:
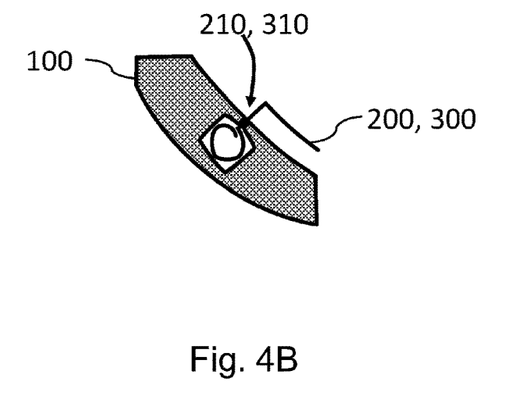
Figure 4C:
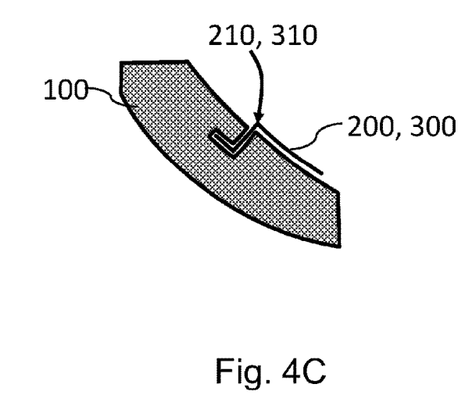
Figure 4D:
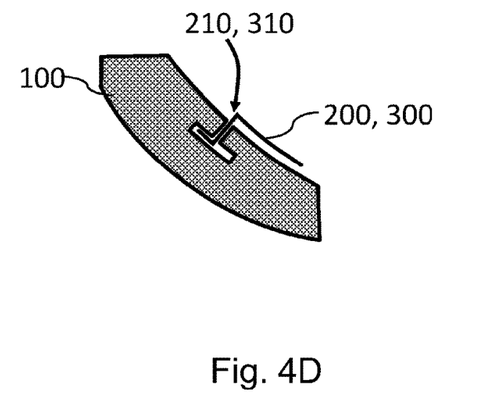

Here, there are various ways to form the recess in the housing 100. For example, it is possible for a circular recess to be formed as shown in FIG. 4A. Optionally, a square or quadrangular shape can also be selected, as shown in FIG. 4B. FIG. 4C shows an embodiment with an L-shaped engagement, and FIG. 4D shows an example of a T-shaped engagement with the housing 100. For both exemplary embodiments, the sliding foil 200, 300 can be inserted into the recess in the axial direction. After insertion, the sliding foil 200, 300 can be fixed accordingly (e.g. via a locking device). These recesses offer the advantage that the sliding foils 200, 300 can be easily exchanged, so that the sliding foils 200, 300 can be specifically selected according to the requirements.

Advantages of exemplary embodiments of the present invention can be summarized as follows:

Bump foils, as used in conventional air bearings, can be omitted. Instead, single- or multilayered films 200, 300 are used. This makes production easier and saves costs.

The bearing function is provided solely by a modified sliding foil 200, 300, wherein the modification is achieved by effectively increasing the rigidity of the foils.

Similarly, the foils 200, 300 may be prestressed and thus pressed into the corresponding opening of the housing. This allows larger radial impacts to be absorbed.

Damping of radial movements can be achieved by adjusting the friction between the foil 200, 300 and the housing 100.

A defined interaction of the individual components results in better predictability.

The features of the invention disclosed in the description, the claims and the figures may be essential for implementing the invention both individually and also in any combination.

LIST OF REFERENCE NUMERALS 50, 520 rotatable element/rotor
100 housing with opening
110 inner side of the opening
111, 221 coatings
200, 300 sliding foils (singlelayered or multilayered)
210, 310 first end portion of the sliding foils or of their layers
220, 320 second end portion of the sliding foils or of their layers
222 edge contours of the end portions
510 conventional housing
530 conventional top foils
540 conventional bump foils
532 foil attachment
α angle of impact of the second end portion on the housing

What is claimed is:

1. A gas bearing for supporting a rotatable element in a contact-free manner during a rotational movement, comprising:
a housing having an opening for receiving the rotatable element; and
at least two single-layered sliding foils arranged without overlap on an inner side of the opening and each having a first end portion and a second end portion for support on the housing,
wherein the single-layered sliding foils are configured to radially support the rotatable element relative to the housing only through the first and second end portions, wherein the second end portion provides frictional contact with the inner side and the first end portion is secured to the housing,
and, when the rotating element is not yet rotating relative to the housing, the rotatable element contacting at least one of the at least two single-layered sliding foils between the first end portion and the second end portion.

2. The gas bearing according to claim 1, wherein the frictional contact includes at least one of the following features for increasing a coefficient of friction and/or friction work of the frictional contact:
a coating of the second end portion and/or the inner side of the opening with a material that increases the coefficient of friction;
the second end portion and/or the inner side of the opening comprises an increased roughness;
the second end portion comprises a contour;
the second end portion is bent relative to the remaining portion of the sliding foil to form by the bending an increased contact angle for frictional contact relative to the inner side of the opening.

3. The gas bearing according to claim 1, wherein the opening in the housing is non-cylindrical to increase a contact angle of the second end portion with respect to the inner side.

4. The gas bearing according to claim 1, wherein a thickness of the sliding foil varies between the first end portion and the second end portion to increase the supporting effect for radially acting forces.

5. The gas bearing according to claim 1, wherein the attachment of the first end portion to the housing comprises at least one of the following connections: a soldered connection, a welded connection, an adhesive connection, and an at least partial insertion of the first end portion into a recess of the housing.

6. A rotor suspension, comprising:
the gas bearing according to claim 1; and
the rotatable element insertable into the opening of the housing such that sliding foils are arranged between the rotatable element and the housing to receive forces acting radially on the rotatable element relative to the housing and to form an air cushion with increasing rotational speeds.

7. The rotor suspension according to claim 6, wherein the sliding foils are exchangeable, in order to select the sliding foils with respect to their stiffness and depending on the rotatable element and the expected radial impacts.

8. A gas bearing for supporting a rotatable element in a contact-free manner, having the following features:
a housing having an opening for receiving the rotatable element; and
a plurality of multilayered sliding foils, wherein each multilayered sliding foil is arranged without overlapping an adjacent multilayered sliding foil on an inner side of the opening, and the individual layers of the multilayered sliding foils are all fixed to the housing with a first end portion, and the opposite second end portion forms a frictional contact with another layer of the multilayered sliding foil or with the housing;
wherein each layer of the multilayered sliding foils forms a circular segment in a radial section along a surface facing the rotatable element; and
wherein the opening in the housing is non-cylindrical to increase a contact angle of the second end portion with respect to the inner side.

9. The gas bearing according to claim 8, wherein the frictional contact includes at least one of the following features for increasing a coefficient of friction and/or friction work of the frictional contact:
a coating of the second end portion and/or the inner side of the opening with a material that increases the coefficient of friction;
the second end portion and/or the inner side of the opening comprises an increased roughness;
the second end portion comprises a contour;
the second end portion is bent relative to the remaining portion of the sliding foil to form by the bending an increased contact angle for frictional contact relative to the inner side of the opening.

10. The gas bearing according to claim 8, wherein a thickness of the sliding foil varies between the first end portion and the second end portion to increase the supporting effect for radially acting forces.

11. The gas bearing according to claim 8, wherein the attachment of the first end portion to the housing comprises at least one of the following connections: a soldered connection, a welded connection, an adhesive connection, and an at least partial insertion of the first end portion into a recess of the housing.

12. A rotor suspension, comprising:
the gas bearing according to claim 8; and
the rotatable element insertable into the opening of the housing such that the sliding foils are arranged between the rotatable element and the housing to receive forces acting radially on the rotatable element relative to the housing and to form an air cushion with increasing rotational speeds.

13. The rotor suspension according to claim 12, wherein the sliding foils are exchangeable, in order to select the sliding foils with respect to their stiffness and depending on the rotatable element and the expected radial impacts.

14. A method for manufacturing a gas bearing for supporting a rotatable element in a contact-free manner during a rotational movement, comprising:

providing a housing having an opening for receiving the rotatable element;
arranging at least two sliding foils extending in an arc-shaped manner single-layered between a first end portion and a second end portion on an inner side of the opening without adjacent sliding foils overlapping, wherein relative to the housing the first end portion is tangentially immovable and the second end portion provides a frictional contact with the housing; and
inserting the rotatable element into the opening so that the at least two sliding foils are disposed between the rotatable element and the housing,
and, when the rotating element is not yet rotating relative to the housing, the rotatable element contacting the sliding foils between the first end portion and the second end portion.

15. The method according to claim 14, wherein arranging the sliding foils comprises fixedly attaching the sliding foils to the housing or forming a releasable connection to the housing.

* * * * *